United States Patent
Swanson et al.

(10) Patent No.: US 11,745,861 B2
(45) Date of Patent: Sep. 5, 2023

(54) ACTIVE VIBRATION CONTROL SYSTEM IN A GUNFIRE VIBRATION ENVIRONMENT

(71) Applicant: LORD Corporation, Cary, NC (US)

(72) Inventors: Douglas Swanson, Cary, NC (US); Paul Joseph Bachmeyer, Charlotte, NC (US)

(73) Assignee: LORD Corporation, Cary, NC (US)

( * ) Notice: Subject to any disclaimer, the term of this patent is extended or adjusted under 35 U.S.C. 154(b) by 183 days.

(21) Appl. No.: 17/432,041

(22) PCT Filed: Feb. 25, 2020

(86) PCT No.: PCT/US2020/019710
§ 371 (c)(1),
(2) Date: Aug. 18, 2021

(87) PCT Pub. No.: WO2020/176515
PCT Pub. Date: Sep. 3, 2020

(65) Prior Publication Data
US 2022/0185463 A1 Jun. 16, 2022

Related U.S. Application Data

(60) Provisional application No. 62/939,728, filed on Nov. 25, 2019, provisional application No. 62/809,918, filed on Feb. 25, 2019.

(51) Int. Cl.
*B64C 27/00* (2006.01)
(52) U.S. Cl.
CPC ...... *B64C 27/001* (2013.01); *B64C 2027/004* (2013.01)
(58) Field of Classification Search
CPC .................. B64C 27/001; B64C 2027/004
See application file for complete search history.

(56) References Cited

U.S. PATENT DOCUMENTS

| 6,772,074 B2 | 8/2004 | Millott et al. |
| 9,073,627 B2 | 7/2015 | Jolly et al. |

(Continued)

FOREIGN PATENT DOCUMENTS

| WO | WO 2014/18664 A2 | 1/2014 |
| WO | WO 2020/176515 A1 | 4/2014 |

OTHER PUBLICATIONS

International Search Report and Written Opinion for Application No. PCT/US2020/019710 dated May 12, 2020.

(Continued)

*Primary Examiner* — Nicholas McFall
(74) *Attorney, Agent, or Firm* — KDW FIRM PLLC

(57) ABSTRACT

Systems and method for active vibration control on an aircraft. An active vibration control system (AVCS) is configured for an aircraft having an aircraft structure and a gun. The AVCS includes at least one control sensor on the aircraft, at least one force generator on the aircraft, and at least one controller in electronic communication with the sensor and the force generator. The controller is configured for determining, using the at least one control sensor, force generating commands for controlling vibrations acting on the aircraft structure, sending the force generating commands to the at least one force generator, causing the at least one force generator to produce a vibration canceling force, determining that the gun is firing, and in response to determining that the gun is firing, determining different force generating commands and sending the different force generating commands to the at least one force generator.

20 Claims, 11 Drawing Sheets

(56) References Cited

U.S. PATENT DOCUMENTS

2002/0120415 A1    8/2002   Millott et al.
2011/0229319 A1    9/2011   Bacic et al.

OTHER PUBLICATIONS

Indian Office Action for Application No. 202117040561 dated Jul. 4, 2022.

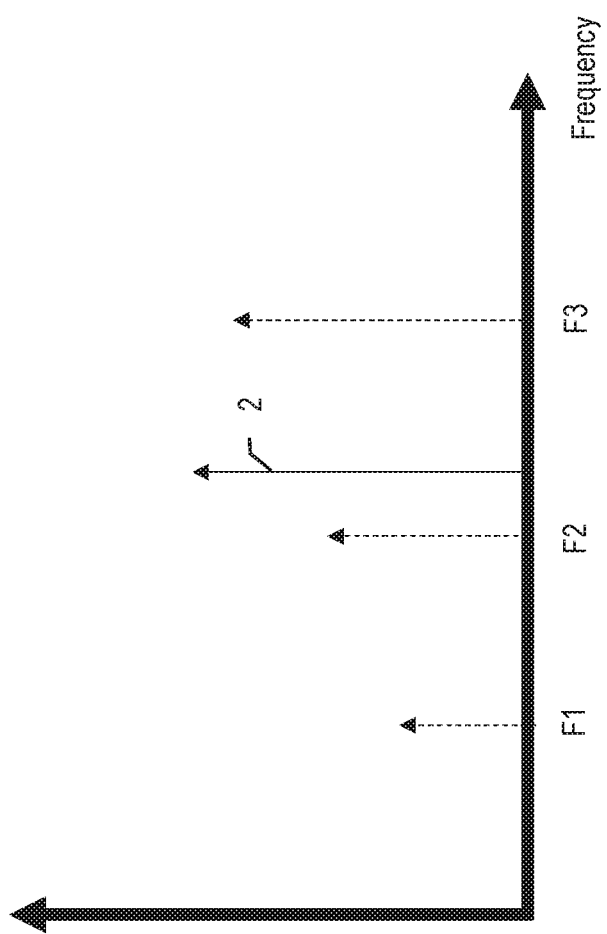

ACTIVE VIBRATION CONTROL SYSTEM IN A GUNFIRE VIBRATION ENVIRONMENT

CROSS REFERENCE TO RELATED APPLICATIONS

This application claims priority to U.S. Provisional Patent Application Ser. No. 62/809,918, filed Feb. 25, 2019, the disclosure of which is incorporated by reference herein in its entirety. This application also claims priority to U.S. Provisional Patent Application Ser. No. 62/939,728, filed Nov. 25, 2019, the disclosure of which is incorporated by reference herein in its entirety.

TECHNICAL FIELD

The subject matter disclosed herein relates generally to the design and operation of an active vibration control system (AVCS) for aircraft. More particularly, the subject matter disclosed herein relates to adapting an AVCS for use on a fixed wing or rotary wing aircraft having weaponry positioned thereon and the active damping of vibrations in the aircraft in the presence of vibrations induced as the weaponry fires.

BACKGROUND

Active Vibration Control Systems (AVCS) are used on aircraft to reduce or eliminate vibrations in the aircraft structure or on components within the aircraft. These vibrations are induced by the rotors, propellers, engines, transmissions, flight conditions, etc. Known AVCS are good at eliminating all or most these vibrations.

The problem is that guns on an aircraft generate an additional vibration input when they fire. Guns as used here and throughout this disclosure include all forms of aircraft mounted guns, rockets, missiles and other military related weaponry. This gunfire vibration can be repetitive or impulsive in nature and generates vibration at a fundamental frequency with many harmonics. When one of the gunfire harmonic frequencies is close (typically within several Hz) to the vibration frequency of control for an AVCS, it can negatively impact the performance of the AVCS because the AVCS control accelerometers/sensors and/or force generators are impacted by the gunfire vibration. Using a helicopter (also referred to as a rotary wing aircraft), an AVCS is typically used to control vibration at the N/rev frequency, which is equal to the main rotor speed multiplied by N (the number of blades). By adding the vibration induced by a gun firing, the AVCS attempts to cancel the vibration from the gunfire as well as the main rotor. Unfortunately, the known AVCS typically cannot control aircraft vibration well in this environment and has degraded performance.

SUMMARY

Active Vibration Control Systems (AVCS) that operate in an aircraft with gunfire need improvements over existing systems to provide proper vibration control without being affected by the vibration created by the gunfire. This specification describes improvements to existing AVCS and allow for AVCS operation in a gunfire environment. This specification describes an AVCS that provides good vibration control at the N/rev frequency during a gunfire event by automatically or manually recognizing the presence of gunfire vibration and responding by filtering out or ignoring the gunfire vibration, and/or modifying the force generator response.

BRIEF DESCRIPTION OF THE DRAWINGS

FIG. 1C is a frequency diagram illustrating an example of gunfire induced vibration in the presence of vibration from a propulsion system.

DETAILED DESCRIPTION

The systems and methods described in this specification allow an AVCS to continue to cancel vibrations from a propulsion system with the AVCS vibration control either not affected or minimally affected by gunfire during the duration of the gunfire. This can improve overall comfort in the aircraft to the pilot and crew and could also help protect aircraft structure or avionics from the damaging effect of vibration. Some conventional vibration control systems do not contain features to recognize and filter out or ignore gunfire vibration. Conventional vibration control systems also lack capability in a Circular Force Generator (CFG) to operate under gunfire events, especially in a low power mode.

This specification describes systems and methods for (1) the AVCS to automatically or manually detect the presence of gunfire vibration, and for (2) the AVCS to filter out or ignore the effect of gunfire vibration while continuing to control vibrations from a propulsion system, e.g., N/rev vibration.

Figure 1A:
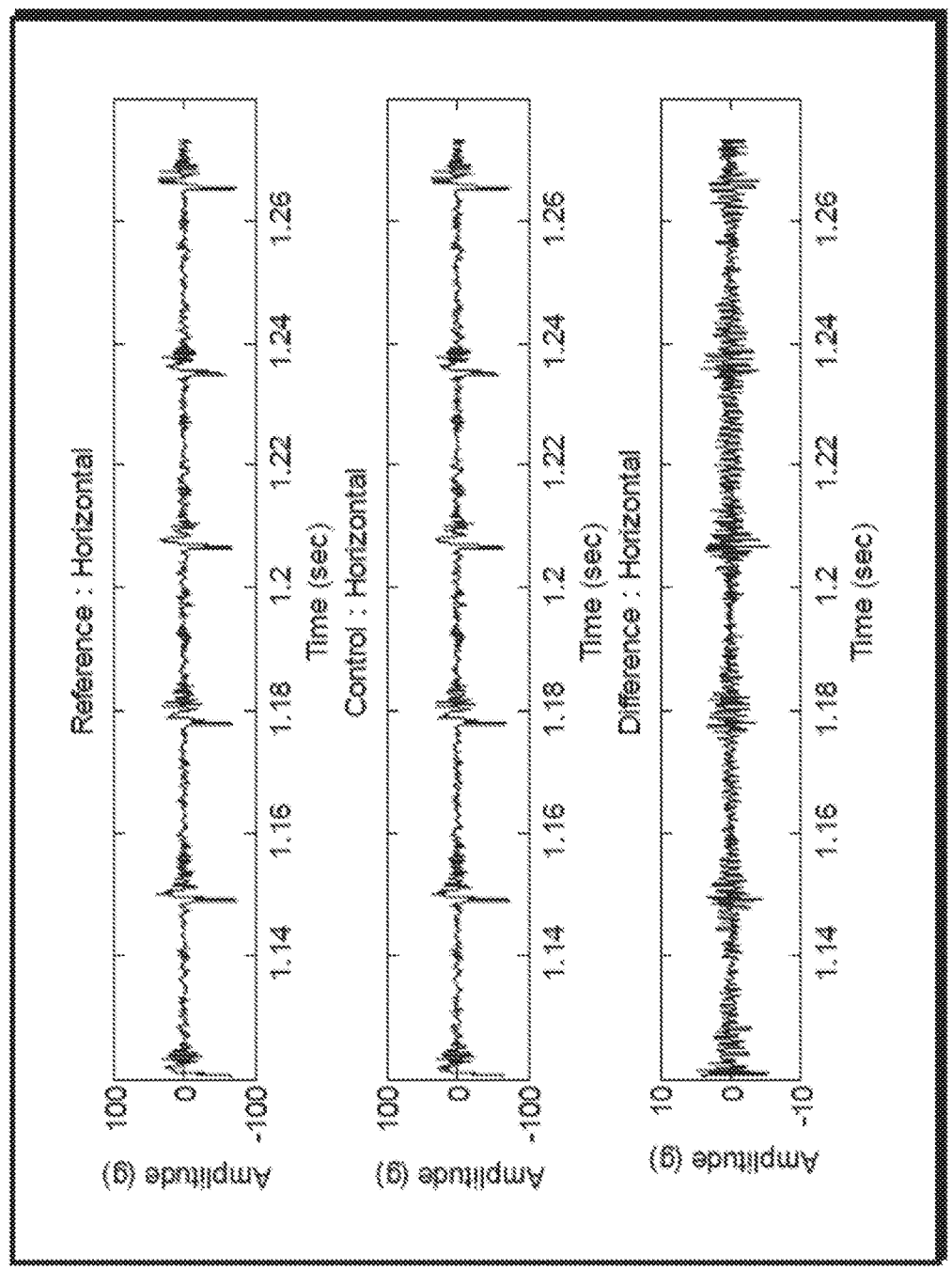
FIG. 1A is chart illustrating the vibrations generated from gunfire.

FIG. 1A is chart illustrating the vibrations generated from gunfire. The chart is an excerpt from MIL-STD-810G (FIG. 519.7A-4). The chart shows amplitudes of vibrations over time for guns firing at 2000 rounds per minute.

Shock from gunfire on an aircraft translates into vibrations on the aircraft structure. Testing for gunfire shock on an aircraft is defined by the commercially available U.S. military standard, MIL-STD-810G, Method 519.7, Gunfire Shock, which is used to test aircraft equipment for gunfire shock. Per MIL-STD-810G, Method 519.7, Section 1.2 "The gunfire environment may be considered to be a high rate repetitive shock having form of a substantial transient vibration produced by (1) an air-borne gun muzzle blast pressure wave impinging on the materiel at the gun firing rate, (2) a structure-borne repetitive shock transmitted through structure connecting the gun mechanism and the materiel, and/or a combination of (1) and (2). The closer the materiel surface is to direct pressure pulse exposure, the more likely the measured acceleration environment appears as a repetitive shock producing high rise time and rapid decay of materiel response, and the less role the structure-borne repetitive shock contributes to the overall materiel response environment. The farther the materiel surface is from direct pressure pulse exposure, the more the measured acceleration environment appears as a structure-borne high rate repetitive shock (or a substantial transient vibration) with some periodic nature that has been filtered by the structure intervening between the gun mechanism and the materiel. Repetitive shock applied to a complex multi-modal materiel system will cause the materiel to respond (1) at forced frequencies imposed on the materiel from the external excitation environment, and (2) to the materiel's resonant natural frequencies either during or immediately after application of the external excitation."

Figure 1B:
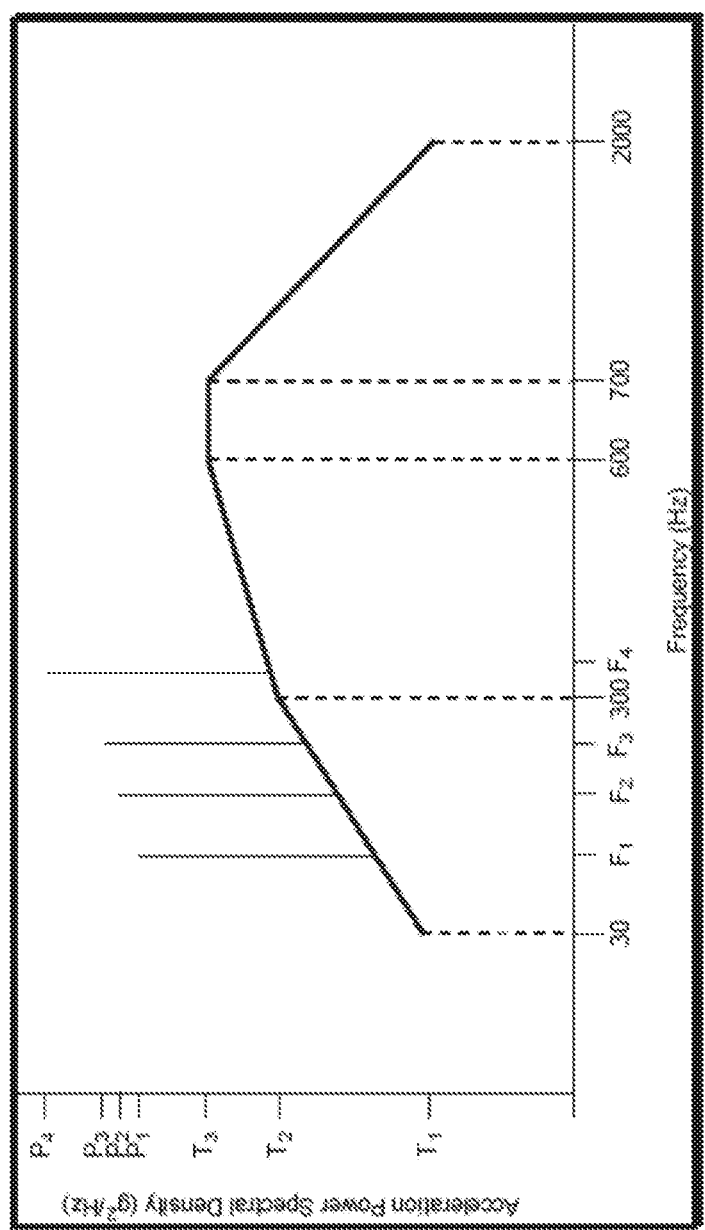
FIG. 1B is a frequency diagram illustrating a generalized gunfire induced vibration spectrum shape.

FIG. 1B is a frequency diagram illustrating a generalized gunfire induced vibration spectrum shape. The diagram is an excerpt from MIL-STD-810G (FIG. 519.7D-1). The diagram shows the gun firing rate fundamental frequency, F1, and at least some of the harmonics, F1, F2, F3, and F4. Per MIL-STD-810G, Method 519.7, Section 2.2, the vibration spectrum is "characterized by four single frequency harmonically related (sine) vibration peaks superimposed on a broadband random vibration spectrum. The vibration peaks are at frequencies that correspond to the nominal gunfire rate and the first three harmonics of the gun firing rate." Note that the frequencies of the first 2 harmonics can be calculated as follows: F2=2F1, F3=3F1, F4=4F1.

FIG. 1C is a frequency diagram illustrating an example of gunfire induced vibration in the presence of vibration from a propulsion system. As shown in FIG. 1C, a main rotor creates vibration at the N/rev frequency, which is illustrated as a first tone 2 on the frequency diagram. The gunfire creates vibration at the gunfire rate, which is illustrated as tone F1 on the frequency diagram, and at least two harmonics of the gun firing rate, illustrated as two tones F2 and F3 on the frequency diagram. If the gunfire rate vibrations F1 (or one of the harmonics F2 or F3 or other) is within a certain frequency distance of the N/rev frequency, then the gunfire may adversely affect a vibration control system that is controlling for the N/rev vibrations.

Figure 2A:
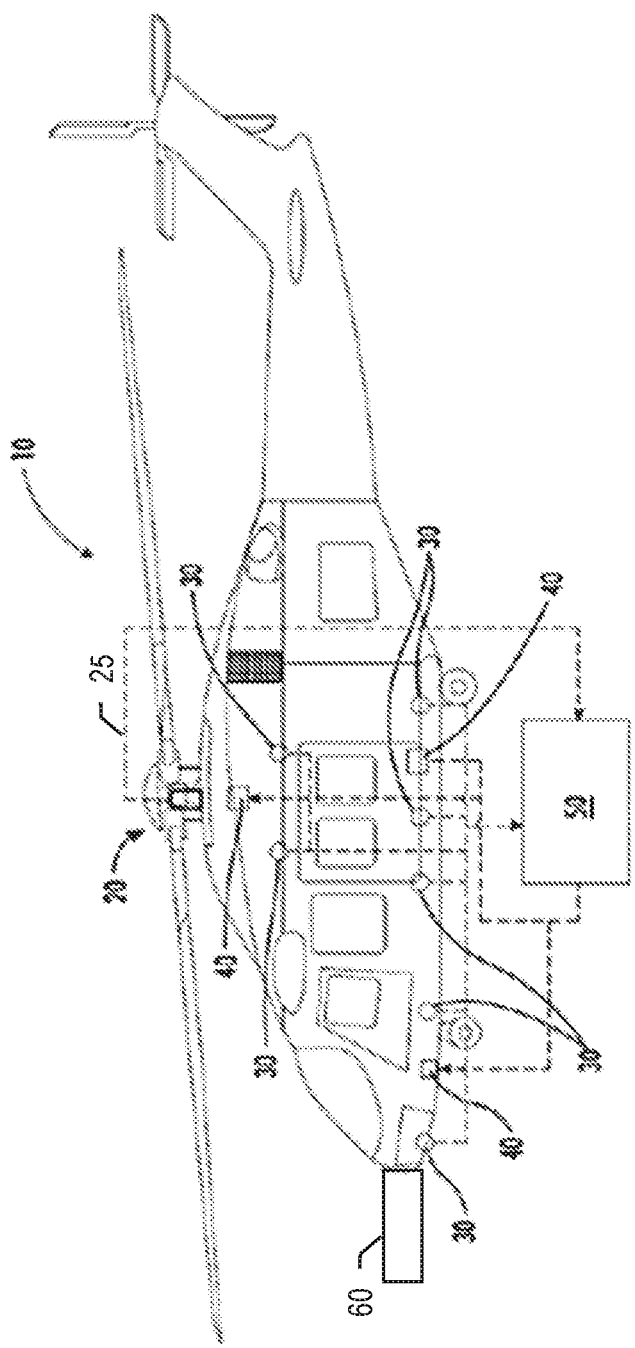
FIG. 2A illustrates an aircraft in a gunfire environment.

FIG. 2A illustrates an aircraft in a gunfire environment. The aircraft is represented by helicopter 10 in FIG. 2A. However, the aircraft can be a fixed wing aircraft or a rotary wing aircraft with one or more engines and/or one or more rotors or propellers. In some examples, the aircraft is a jet engine aircraft.

The aircraft includes a propulsion system; in this example, the helicopter 10 includes a main rotor 20. A tachometer signal 25 from the main rotor 20 is indicative of the rotational speed of main rotor 20. The helicopter 10 also includes one or more control sensors 30, at least one force generator 40, an electronic controller 50, and a gun 60. The control sensors 30 can be, e.g., accelerometers.

The electronic controller 50 can be implemented using any appropriate computer technology, e.g., with one or more processors and memory storing instructions for the processors. The electronic controller 50 receives the tachometer signal 25 as an input. The electronic controller 50 also receives sensor signals from the control sensors 30. Collectively, the control sensors 30, the force generator 40, and the electronic controller 50 form the core elements of an AVCS.

Figure 2B:
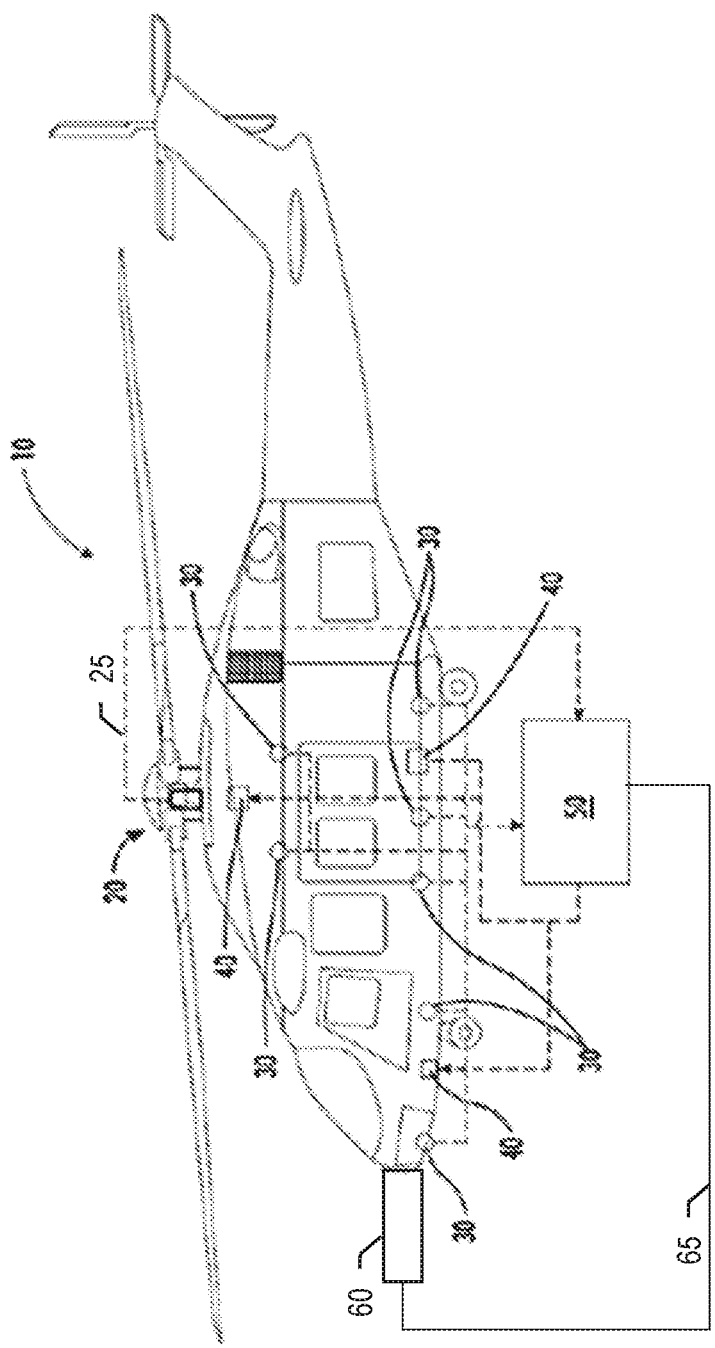
FIG. 2B illustrates an example configuration of the helicopter where the electronic controller receives a gunfire detection signal.

FIG. 2B illustrates an example configuration of the helicopter 10 where the electronic controller 50 receives a gunfire detection signal 65. The gunfire detection signal 65 can be transmitted directly from the gun 60 to the electronic controller 50 to indicate that the gun 60 is firing or that the gun 60 will be firing within a specified period. Alternatively, the electronic controller 50 can receive the gunfire detection signal 65 from another source, e.g., an aircraft control system or gun control system configured for controlling the gun.

The electronic controller 50 provides force commands to the force generator 40 to cancel vibrations from the main rotor 20. Using the force commands, the force generator 40 creates a force to cancel vibration at the control sensors 30. Typically, an AVCS will include several force generators 40 and control sensors 30.

Figure 3:
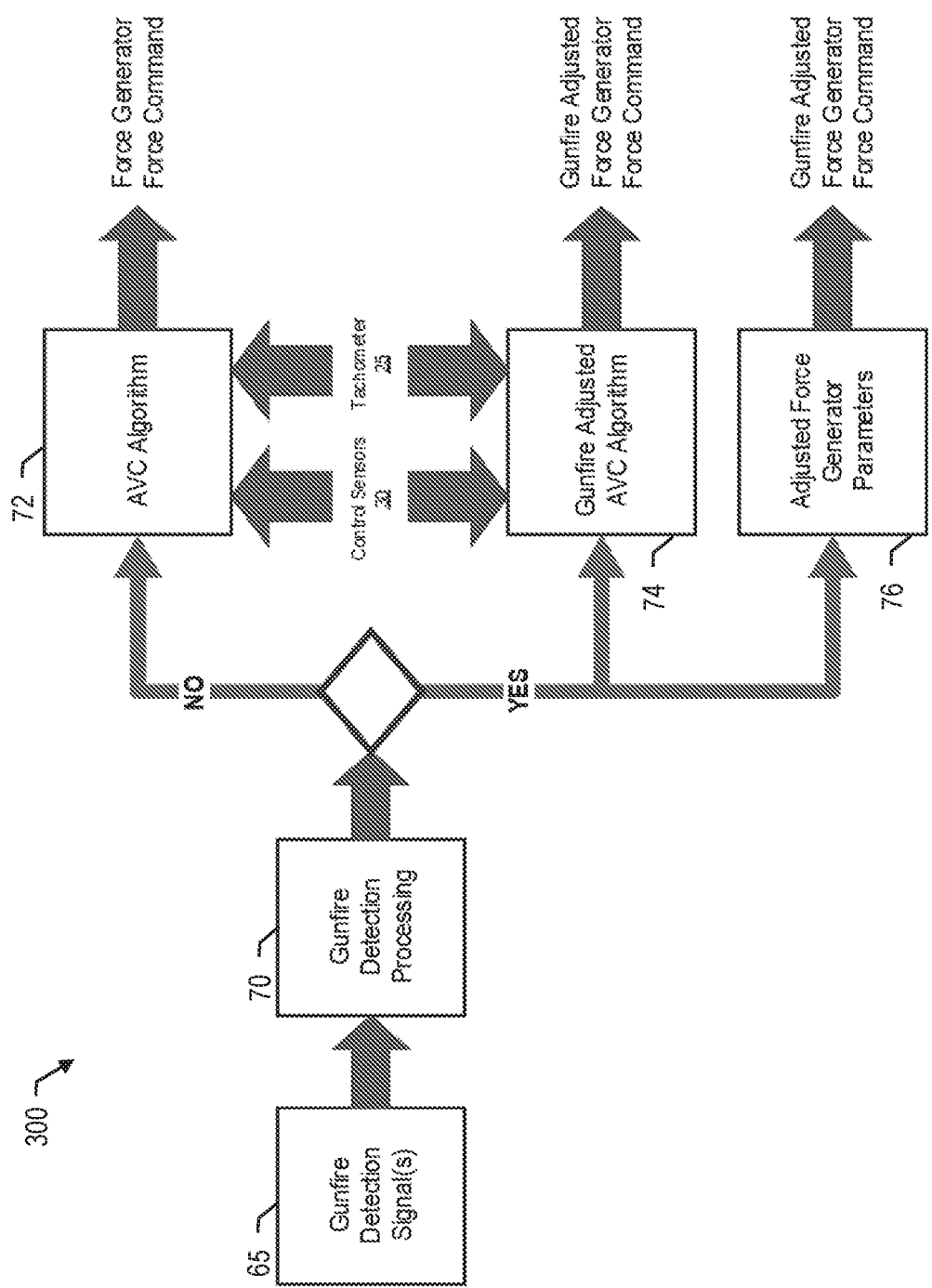
FIG. 3 is a block diagram illustrating an example active vibration control method adapted for gunfire.

FIG. 3 is a block diagram illustrating an example active vibration control method 300 adapted for gunfire. The method 300 is performed by an AVCS, such that some steps of the method 300 are performed by the electronic controller 50 and some steps may be performed by the force generators 40.

As shown in FIG. 3, the AVCS receives a gunfire detection signal 65. The gunfire detection signal 65 may originate from the gun 60 or a gun control system or vehicle control system, or, alternatively, the gunfire detection signal 65 may generated in the AVCS, e.g., by the electronic controller 50 processing the sensor signals from the control sensors 30. The AVCS performs gunfire detection processing 70 and determines whether or not the gun 60 is firing or is going to fire after a specified period.

If the gun is not firing, the AVCS performs the non-firing active vibration control (AVC) algorithm 72 to generate force generator force commands. The AVC algorithm 72 uses inputs from the control sensors 30 and the tachometer signal 25 to generate force commands to cancel the vibration from the propulsion system, e.g., the N/rev vibration. The force generators receive the force commands and output responsive forces.

In an active vibration control system, vibration reduction is typically accomplished by minimizing a quadratic cost function in the frequency domain:

$$J = e^H Q e$$

Where J is the cost function, e is a vector of "error" signals from the control sensors 30 and Q is a weighting matrix to emphasize one control sensor location over another. The superscript H refers to Hermitian, which is the complex conjugate transpose operator.

In a typical active vibration control system, a Filtered-X Least Mean Square (LMS) algorithm is used to minimize the cost function in a gradient descent technique. In this case, the force command output signal u at time (k+1) is equal to:

$$u_{k+1} = u_k - \mu C^H Q e_k$$

Where $u_{k+1}$ is the force command at time k+1, $u_k$ is the force command at time k, $\mu$ is the adaption rate (also called the A-weights), C is the transfer function matrix between control sensor (error) output to force generator force command input, superscript H is the Hermitian operator, Q is the sensor weighting matrix and $e_k$ is the control sensor vector at time k. Note that this does not include the effect of force generator effort weighting, which can show up as a "leak" term which is multiplied by $u_k$. Note that $u_{k+1}$ in this equation would represent the force generator force command in 72 of FIG. 3.

In an AVCS that is configured to operate in a gunfire environment, the force output is modified to minimize the effect of gunfire, as illustrated in block 74 of FIG. 3. In this case $e_k$ can be filtered to remove the effect of gunfire, the adaptation rate can be modified, or the force output $u_{k+1}$ can be modified directly (frozen at previous value prior to gunfire, or set to zero or some other value).

If the gun is firing, the AVCS performs the gunfire adjusted AVC algorithm 74 to generate gunfire adjusted force generator force commands. For example, the gunfire adjusted AVC algorithm 74 can filter out the gunfire vibrations or repeat force commands or control parameters used prior to the gunfire event.

The AVCS can detect the gunfire using an appropriate detection mechanism. Typically, only a single method is included in a given system. Consider the following two examples.

In a first example, the AVCS is configured to detect gunfire through electronic communication so that gun 60 or the pilot/crew member can relay information to the AVCS that it is firing. For example, this can be done digitally (through a digital bus such as CAN, MIL-STD-1553, AFDX, RS-422, etc.), through a switch or discrete input/output, an analog output, or wirelessly.

In a second example, the AVCS is configured to automatically detect the gunfire event through its control sensors 30. Typically, guns fire at a fixed rate. If vibration at the known fixed rate frequency increases above a threshold (determined through a Fast Fourier Transform (FFT) calculation), then the AVCS can determine that gun 60 is firing. For example, in some systems, a one of the control sensors 30 is used as a gunfire detection sensor to automatically detect gunfire vibration and is mounted in the near vicinity of the gun 60. In some examples, the gunfire detection sensor is mounted less than one meter from gun 60. The signal to noise of the accelerometer could also be used to detect gunfire (if signal to noise decreases greatly, then gunfire event occurs).

Once the AVCS determines that gun 60 is firing, it can filter out or ignore the effects of the gunfire. There are several different ways that this could be done. In some examples, the AVCS filters out the gunfire signals from control sensors 30. One possible solution is to use notch filters where the center frequency of the notch filter is at the gunfire frequency or one its harmonics. For this possible solution, it can be useful to do this in the frequency vicinity of the N/rev vibration that the AVCS is canceling. Another possible solution is to use comb filters to filter out the gunfire vibration at the gunfire frequency and its harmonics. The comb filters will transmit information at all frequencies except for the vibration at the gunfire frequencies.

Another possible solution to filter out the gunfire signal is to freeze (i.e., keep the value constant) the AVCS force magnitude and phase and frequency output and keep outputting the previous force that occurred just prior to the gunfire event during the time that the gunfire is occurring. Another means for freezing the AVCS force output could be accomplished by freezing (keeping the value constant) the LMS adaptation weights (typically called A-weights (or µ in equation above)) and leak parameters. An additional method would be to replay the last time configurable seconds of force commands during the gunfire event. This possible solution is best when gun 60 is in electronic communication with electronic controller 50 so that electronic controller 50 can synchronize its output to the firing of gun 60. In this method, the AVCS ignores the effect of gunfire when gun 60 is firing.

Gunfire vibration can affect the operation of the force generator 40. In general, the force generator 40 can be any appropriate type of force generator for vibration cancellation. For example, a force generator can be a Circular Force Generator (CFG), Linear Force Generator, Hub Mounted Force Generator, and a Higher Harmonic Control Force Generator. Note that the term Actuator is also sometimes used instead of Force Generator.

The AVCS can additionally, or alternatively, make adjustments in adjusted force generator parameters 76 locally at the level of the force generators 40. For example, the AVCS can:

Tell it to adjust its phase position to a low power setting

Tell it to adjust to different motor tuning optimized for gunfire

Tell a force generator to activate a low resistor to effectively "block" the actuator (which can be useful, e.g., for a linear actuator or voice coil type activation, or in a circular force generator to rapidly spin down to a lower speed).

In some examples, the force generators 40 are configured, e.g., by virtue of appropriate software, to store force commands. In those cases, the AVCS can tell a force generator to repeat a command instead of re-sending a command, e.g., in the gunfire adjusted AVC algorithm 74.

U.S. Pat. No. 9,073,627 describes examples of circular force generators, and U.S. Pat. No. 9,073,627 is hereby incorporated by reference in its entirety. In particular, FIG. 1B of U.S. Pat. No. 9,073,627 illustrates a control structure for controlling helicopter vibrations using circular force generators and an adaptive circular force algorithm. FIG. 3 of U.S. Pat. No. 9,073,627 illustrates circular force generation with two co-rotating imbalanced rotors creating a circular force with controllable magnitude and phase. An example circular force generator is described in column 11, lines 24-49 of U.S. Pat. No. 9,073,627.

Figure 4A:
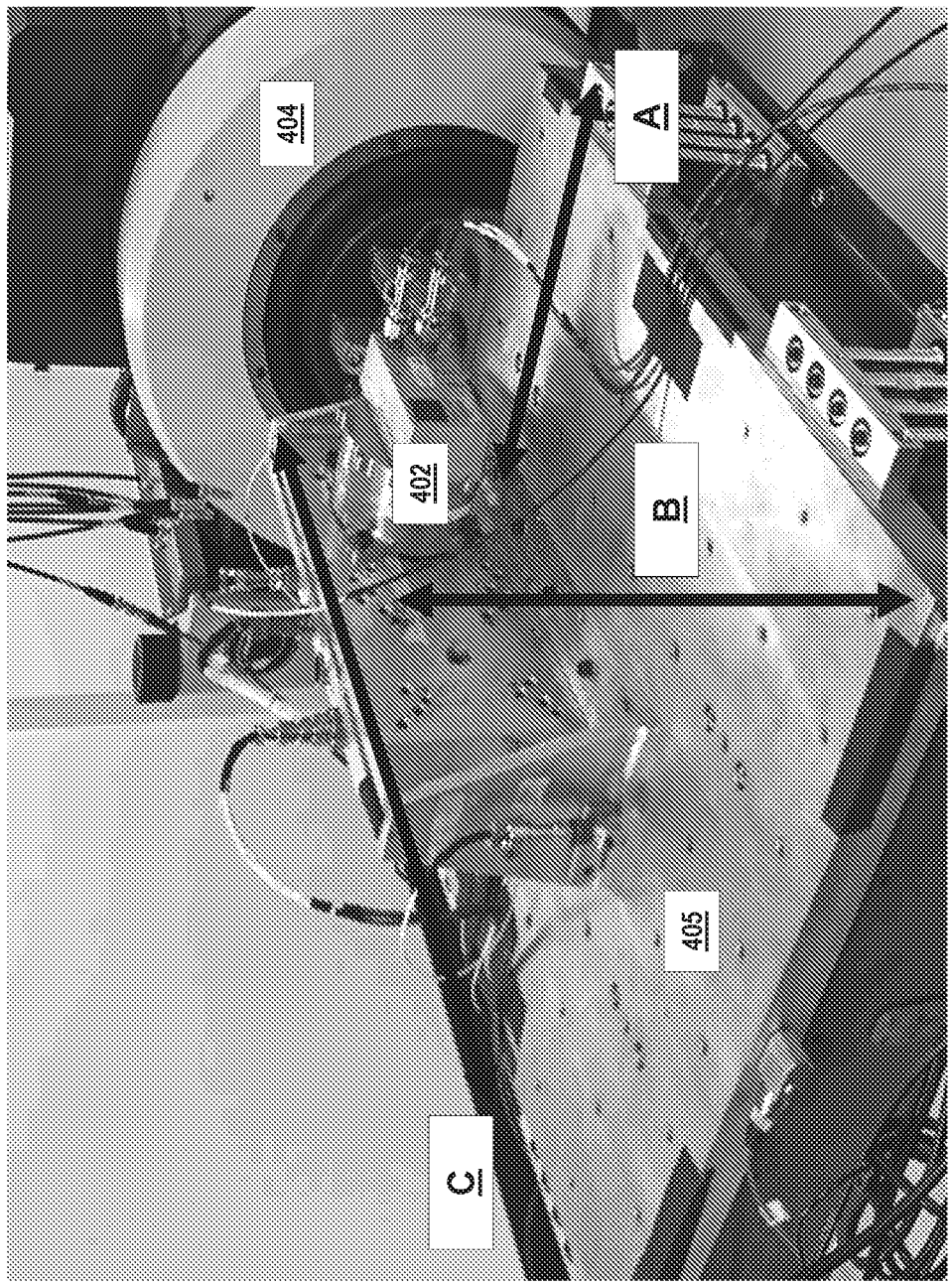
FIG. 4A illustrates a test setup where a production CFG is mounted on a vibration shaker.

FIG. 4A illustrates a test setup where a production CFG 402 is mounted on a slip table 405 that is attached to a vibration shaker 404. FIG. 4A shows three axes labelled A, B, and C. The vibration shaker applies gunfire vibration as a simulated input to the base of the CFG. In FIG. 4A, the gunfire vibration is applied in the C direction. To get shaker inputs into the CFG B axis, the CFG 402 is rotated 90 degrees on the bracket. To get an input into the CFG A-axis, the vibration shaker 404 is rotated so that it is vertical and the slip table 405 is not used.

Figure 4B:
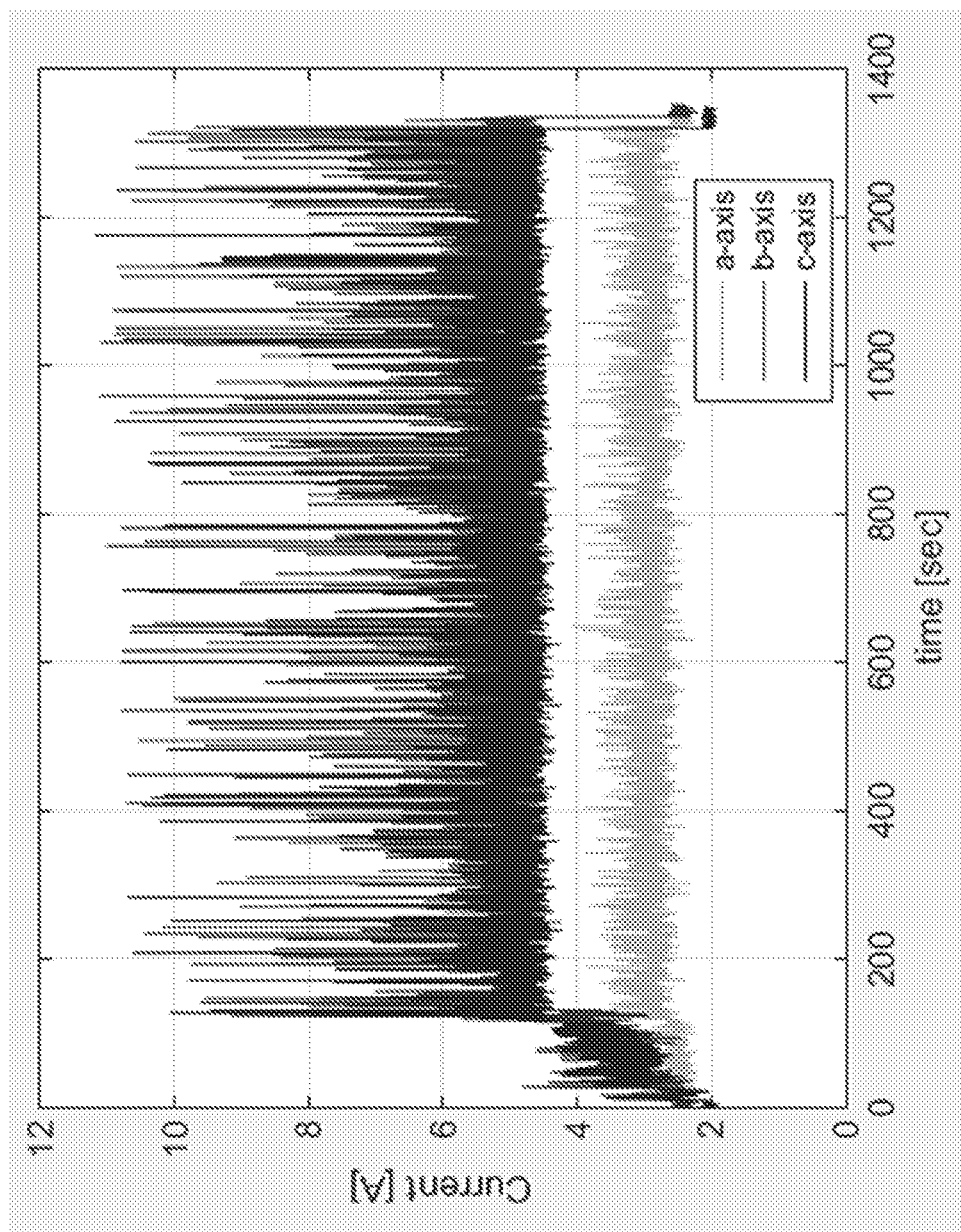
FIG. 4B illustrates the CFG input current when subjected to gunfire.

FIG. 4B illustrates the CFG input current when subjected to gunfire in the A,B,C axes respectively (one at a time, not simultaneously). Note that when the gunfire input is in the same plane as the force output (BC axes), the required current increases while when the gunfire is present 90 degrees to the force output (perpendicular, or in the A axis), then the gunfire has a reduced or minimal impact. Note that the gunfire vibration has no impact on the controller input current.

To minimize the CFG operating current during a gunfire event, in some examples, the system can be configured such that: The CFG could be oriented on the aircraft such that the CFG force output is perpendicular to the gunfire (A axis of the CFG). The force generator control parameters such as control gains in the CFG control loops (for position, velocity, and/or current control) could be lowered during the gunfire event. Notch filters could be used in the CFG control loops at the gunfire firing rate frequency. The CFG error means (force error, imbalance mass phase position tracking error, speed error) could be loosened during the gunfire event.

Additional possible system adjustments for mitigation of gunfire vibration are to provide a zero force magnitude command and/or change the CFG speed to that it is further away from a gunfire harmonic frequency, or electronically brake (short the motor windings together possibly through a resistor) the CFG's so that they spin down very quickly upon detection of a gunfire event, or shutdown power to the CFG's during the gunfire event. These system configurations can reduce the amount of power drawn from the aircraft during the gunfire event; however, the AVCS will not be reducing the N/rev vibration during the gunfire event in this case.

In some examples, the electronic controller 50 and/or the force generators 40 include high vibration protection circuits. The high vibration protection circuits at the controller and/or force generators can be disabled during the gunfire event. This could prevent spurious failures due to the high vibration protection circuit failing to adjust for the gunfire event.

Figure 5A:
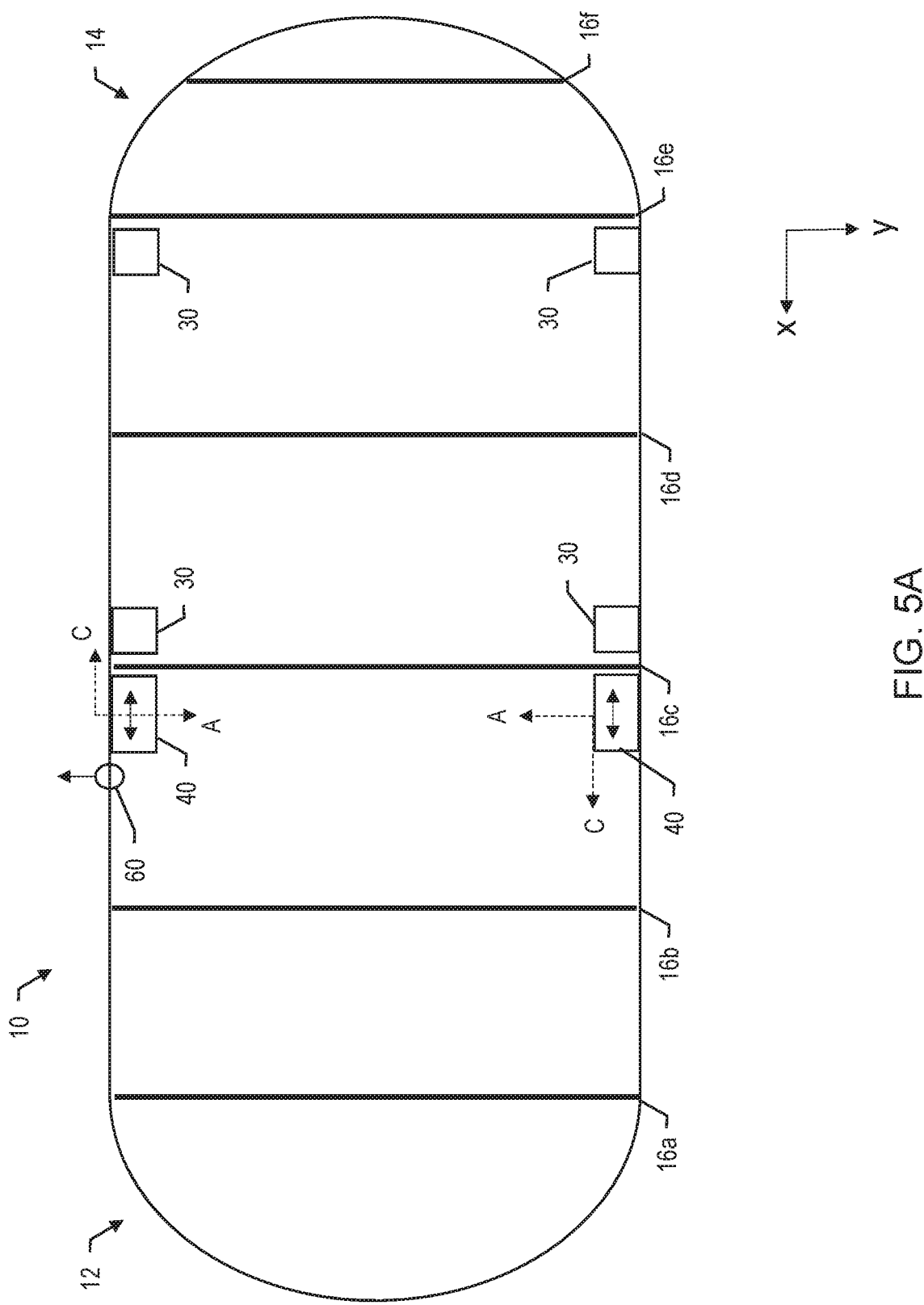
FIG. 5A is a diagram illustrating a possible placement of a CFG with respect to a gun on an aircraft to reduce current draw from the CFG during a gunfire event.

FIG. 5A is a diagram illustrating a possible placement of a CFG with respect to a gun on an aircraft to reduce current draw from the CFG during a gunfire event. FIG. 5A shows the helicopter 10 and an aft section 12 and a nose section 14. The helicopter 10 includes several frame members 16a-f. FIG. 5A also shows a possible placement of the gun 60, several control sensors 30, and several force generators 40. The arrows in the diagram illustrate force generator force output planes as well as the gun firing direction.

As shown in the example of FIG. 5A, the gun 60 produces a gun force in the aircraft Y (lateral) direction. To reduce current drawn, the force generators 40 and control sensors are placed such that their output planes are in XZ (fore-aft/vertical) or X (fore/aft) or Z (vertical) directions. Note that the Z direction is out of the page in FIG. 5A. To further illustrate example force generator orientations, CFG AC axes are labelled in FIG. 5A with dotted lines. The AC axes refer to the AC axes as illustrated in FIG. 4A.

A control sensor, e.g., an accelerometer, can have a sensitive response in 1, 2 or 3 orthogonal directions. If a 1 or 2 axis control sensor is used, it can be useful to align the control sensor such that the sensitive axes do not align with the direction of the gunfire.

Figure 5B:
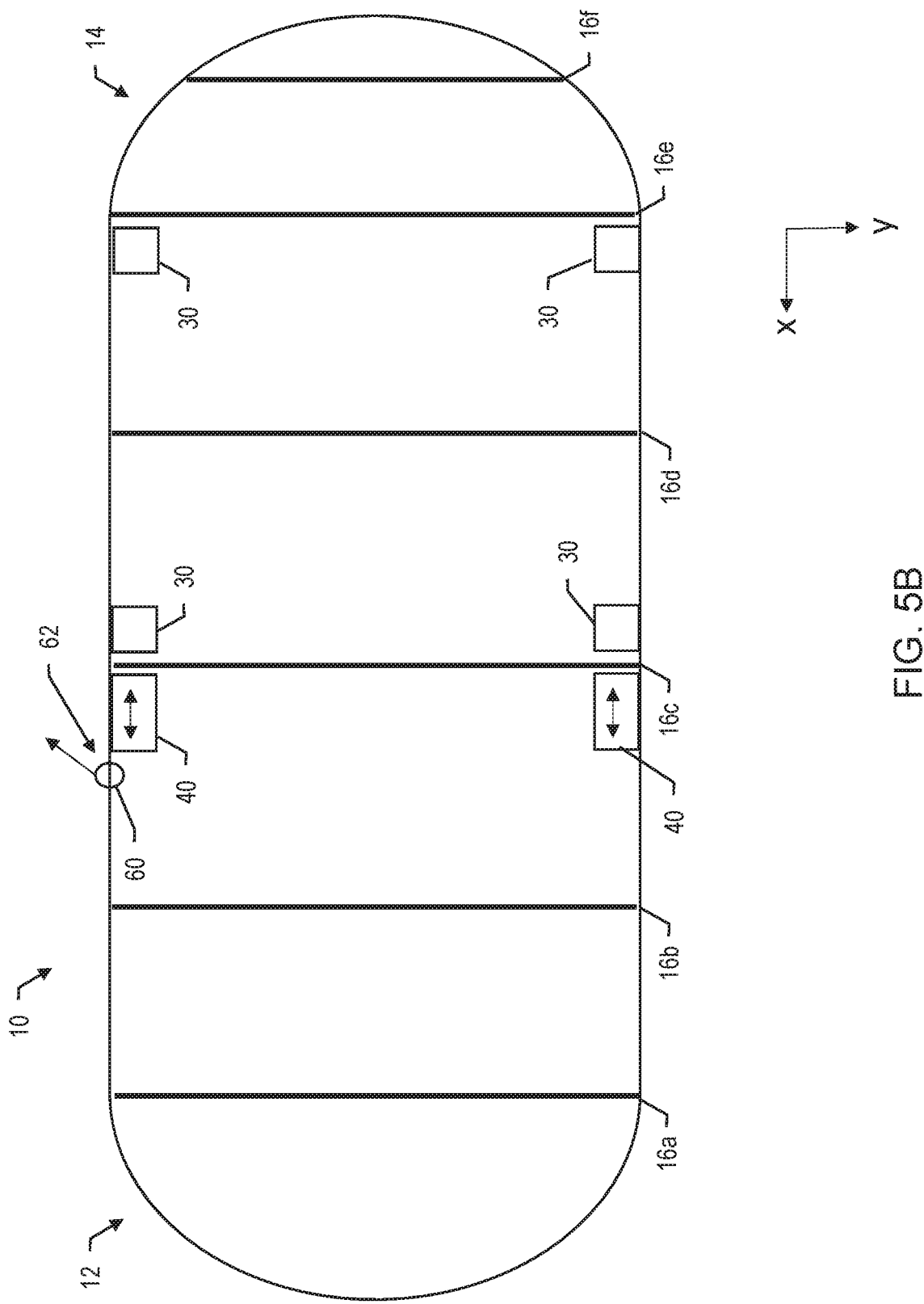
FIG. 5B is a diagram illustrating a different placement of the gun.

FIG. 5B is a diagram illustrating a different placement of the gun 60 such that the gun 60 has a force output that is at an angle 62 with respect to the force generators 40. The force output is not entirely perpendicular but is at least partially perpendicular to the output planes of the force generators 40. Orienting the force generators 40 and/or the control sensors 30 to be at least partially perpendicular to the force output of the gun 60 can still be useful in reducing current drawn during gunfire events, e.g., especially if the angle 62 is greater than a threshold angle. The threshold angle can be, e.g., 45 degrees.

Figure 6:
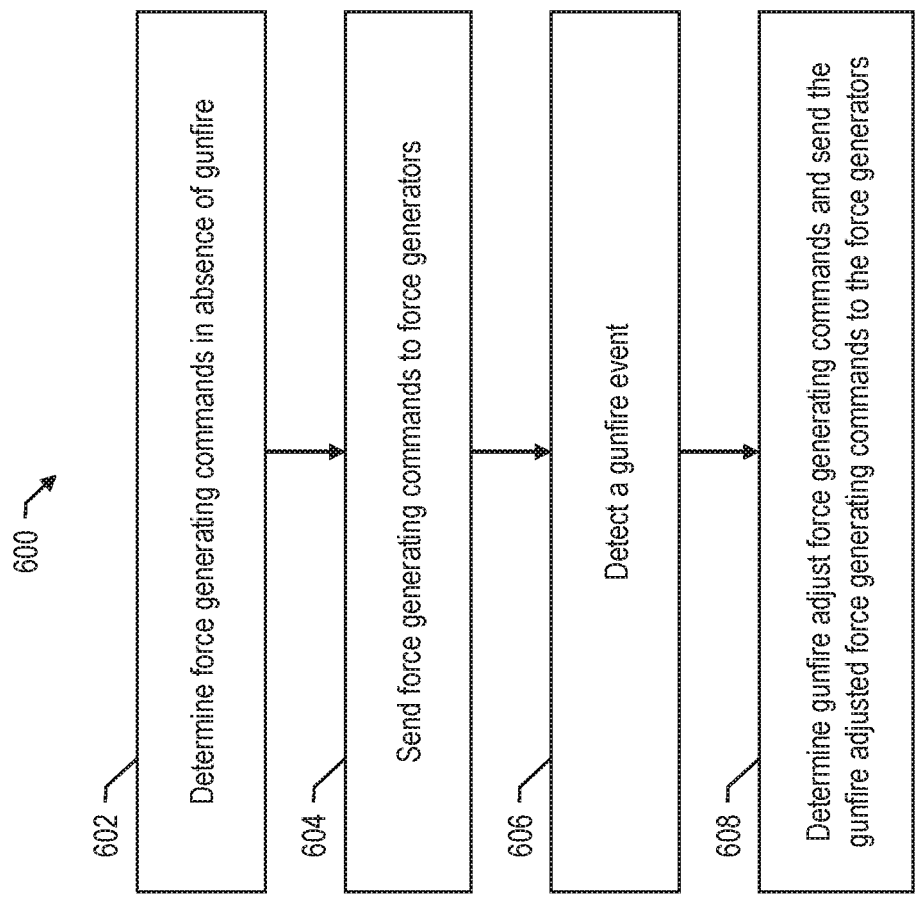
FIG. 6 is a flow diagram illustrating an example method for active vibration control for an aircraft having an aircraft structure and at least one gun positioned on the aircraft.

FIG. 6 is a flow diagram illustrating an example method 600 for active vibration control for an aircraft having an aircraft structure and at least one gun positioned on the aircraft. The method 600 is performed by an AVCS, e.g., an electronic controller or an electronic controller working with force generators.

The method 600 includes determining, using at least one sensor positioned on the aircraft, force generating commands for controlling vibrations acting on the aircraft structure (602). The force generating commands are generated in the absence of gunfire.

The method 600 includes sending the force generating commands to at least one force generator positioned on the aircraft, causing the at least one force generator to produce a vibration canceling force (604). The method 600 includes, after generating the force generating commands, detecting a gunfire event, e.g., determining that the gun is firing or will be firing in a specified period (606). The method 600 includes, in response to detecting the gunfire event, determining gunfire adjusted force generating commands and sending the gunfire adjusted force commands to the at least one force generator (608).

The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. An active vibration control system (AVCS) for an aircraft having an aircraft structure and at least one gun positioned on the aircraft, the AVCS comprising:
   at least one control sensor positioned on the aircraft;
   at least one force generator positioned on the aircraft; and
   at least one controller in electronic communication with the at least one control sensor and the at least one force generator, the at least one controller configured for:
   determining, using the at least one control sensor, a first plurality of force generating commands for controlling vibrations acting on the aircraft structure;
   sending the first plurality of force generating commands to the at least one force generator, causing the at least one force generator to produce a vibration canceling force;
   determining that the gun is firing; and
   in response to determining that the gun is firing, determining a second plurality of force generating commands and sending the second plurality of force generating commands to the at least one force generator.

2. The AVCS of claim 1, wherein determining the first plurality of force generating commands comprises detecting, using the at least one control sensor, a first plurality of vibrations caused by a propulsion system of the aircraft and determining the first plurality of force generating commands such that the vibration cancelling force controls the first plurality of vibrations caused by the propulsion system.

3. The AVCS of claim 2, wherein determining the second plurality of force generating commands comprises determining the second plurality of force generating commands such that the vibration cancelling force continues controlling the first plurality of vibrations caused by the propulsion system in the presence of a second plurality of vibrations caused by the firing of the gun.

4. The AVCS of claim 3, wherein determining the second plurality of force generating commands comprises filtering a sensor signal from the at least one control sensor to remove or reduce the second plurality of vibrations caused by the firing of the gun.

5. The AVCS of claim 4, wherein filtering the sensor signal comprises filtering the sensor signal with a notch filter based on a rate of firing of the gun.

6. The AVCS of claim 5, wherein a center frequency of the notch filter is at a gunfire frequency of the gun or a harmonic of the gunfire frequency of the gun.

7. The AVCS of claim 4, wherein filtering the sensor signal comprises filtering the sensor signal with a comb filter configured for passing the sensor signal at frequencies outside of a gunfire frequency of the gun and a plurality of harmonics of the gunfire frequency of the gun.

8. The AVCS of claim 3, wherein determining the second plurality of force generating commands comprises disregarding a sensor signal from the at least one control sensor, the sensor signal indicating the second plurality of vibrations caused by the firing of the gun, and resending the first plurality of force generating commands.

9. The AVCS of claim 1, wherein determining that the gun is firing comprises receiving a gunfire signal from a gun control system configured for controlling the gun.

10. The AVCS of claim 1, wherein determining that the gun is firing comprises determining, using the at least one control sensor, that a magnitude of a vibration at a gunfire frequency of the gun increased above a threshold magnitude.

11. The AVCS of claim 1, wherein determining that the gun is firing comprises determining that a signal to noise ratio in a sensor signal from the at least one control sensor decreases below a threshold signal to noise ratio.

12. The AVCS of claim 1, wherein determining that the gun is firing comprises determining that the gun is firing using a first control sensor mounted one meter or less from the gun.

13. The AVCS of claim 1, wherein the at least one force generator comprises a first circular force generator oriented on the aircraft such that the first circular force generator produces a first vibration cancelling force that is at least partially perpendicular to a gunfire force produced by the gun when the gun is firing.

14. The AVCS of claim 1, wherein the at least one controller is configured for limiting an operating current of the at least one force generator in response to determining that the gun is firing.

15. The AVCS of claim 14, wherein limiting the operating current of the at least one force generator comprises reducing at least one control gain in a force generator control loop, wherein the at least one control gain is used for position, velocity and/or current controller.

16. The AVCS of claim 14, wherein limiting the operating current of the at least one force generator comprises loosening a force generator error boundary for force output, rotor phase position tracking error, or force speed error.

17. The AVCS of claim 14, wherein limiting the operating current of the at least one force generator comprises sending a zero force command to the at least force generator, or electronically braking the at least one force generator, or shutting down power to the at least one force generator.

18. The AVCS of claim 1, wherein the at least one controller, or the at least one force generator or both, is configured for disabling a high vibration protection system at the at least one electronic controller and/or the at least one force generator in response to determining that the gun is firing.

19. A method for active vibration control for an aircraft having an aircraft structure and at least one gun positioned on the aircraft, the method comprising:
    determining, using at least one control sensor positioned on the aircraft, a first plurality of force generating commands for controlling vibrations acting on the aircraft structure;
    sending the first plurality of force generating commands to at least one force generator positioned on the aircraft, causing the at least one force generator to produce a vibration canceling force;
    determining that the gun is firing; and
    in response to determining that the gun is firing, determining a second plurality of force generating commands and sending the second plurality of force generating commands to the at least one force generator.

20. An aircraft comprising:
    an aircraft structure;
    at least one gun positioned on the aircraft;
    an active vibration control system (AVCS) comprising:
        at least one control sensor positioned on the aircraft;
        at least one force generator positioned on the aircraft; and
        at least one controller in electronic communication with the at least one sensor and the at least one force generator, the at least one controller configured for:
            determining, using the at least one control sensor, a first plurality of force generating commands for controlling vibrations acting on the aircraft structure;
            sending the first plurality of force generating commands to the at least one force generator, causing the at least one force generator to produce a vibration canceling force;
            determining that the gun is firing; and
            in response to determining that the gun is firing, determining a second plurality of force generating commands and sending the second plurality of force generating commands to the at least one force generator.

* * * * *